April 27, 1926.
J. L. HEMP
STOVEPIPE THIMBLE
Filed May 11, 1925
1,582,816
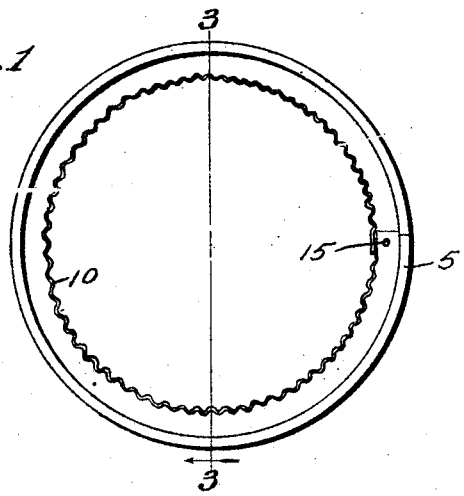
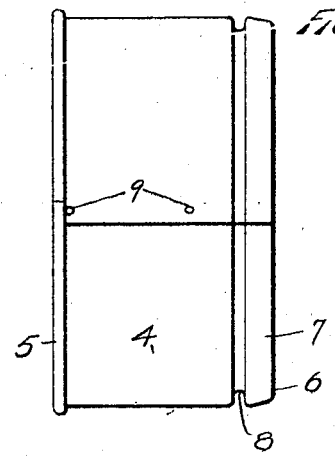
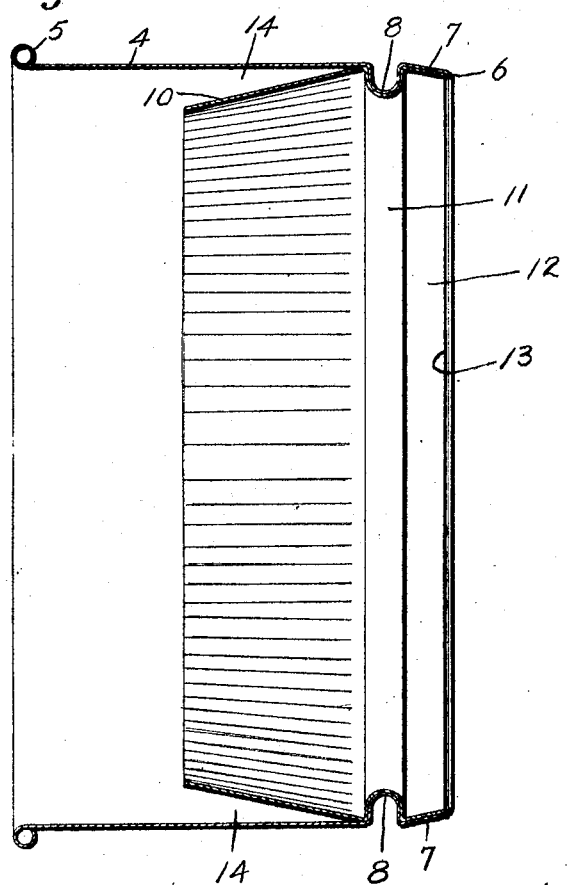
INVENTOR
JOSEPH L. HEMP
BY Edward E. Longan
ATTY.

Patented Apr. 27, 1926.

1,582,816

UNITED STATES PATENT OFFICE.

JOSEPH L. HEMP, OF ST. LOUIS, MISSOURI, ASSIGNOR TO HEMP & COMPANY CORPORATION, OF ST. LOUIS, MISSOURI, A CORPORATION OF MISSOURI.

STOVEPIPE THIMBLE.

Application filed May 11, 1925. Serial No. 29,352.

*To all whom it may concern:*

Be it known that I, JOSEPH L. HEMP, a citizen of the United States, residing at St. Louis, and State of Missouri, have invented certain new and useful Improvements in Stovepipe Thimbles, of which the following is a specification.

My invention relates to improvements in stove pipe thimbles and has for its primary object a stove pipe thimble composed of two pieces which are secured together without the use of any extraneous fastening means and which is so constructed that its insertion in a flue opening is limited and the insertion of a pipe within the thimble is also limited so that there will be no possibility of pushing the pipe through the thimble and into the flue and thus affect the draft of the stove.

A further object is to construct a stove pipe thimble of two separate pieces of sheet metal and secure them together without the use of rivets or similar fastening means and in which the inner member is so arranged that in the event the stove pipe is slightly smaller than the interior diameter of the outer member a tight joint can be made between the pipe and inner member, and thus prevent the leakage of gases into the room.

In the drawings Fig. 1 is a front view of my device;

Fig. 2 is a side elevation of the same; and

Fig. 3 is an enlarged section taken on the line 3—3 of Fig. 1.

In the construction of my device, I employ an outer member 4 which is provided at one edge with a bead 5 and at the other with an inturned portion 6. Adjacent the inturned portion 6 is an inclined portion 7, which is for the purpose of permitting the ready insertion of the thimble in the flue hole. Adjacent the inclined portion 7 is an inwardly projecting bead 8. The member 4 is cylindrical from the bead 5 to the bead 8 and is formed of sheet metal with overlapping edges which are secured together by means of rivets 9. Within the member 4 is inserted a member which has its forward portion 10 tapered and preferably corrugated as in Figs. 1 and 3. The interior member is also provided with an inwardly extending bead 11, which fits over the bead 8 and in this manner the two members are secured together and prevented from coming apart. The portion 12 of the interior member is inclined so as to fit snugly against the inclined portion 7 while the edge 13 is in close proximity to the inturned edge 6. When the two members are assembled, there will be a tapering space 14 between the portion 10 of the interior member and the cylindrical part of the member 4, and in this space the end of the stove pipe passes, the interior member, however, preventing the pipe from passing entirely through the thimble, no matter what force is used, and should the pipe be slightly less in diameter than the diameter of the member, it will engage with some portion of the outer surface of the forward end 10 of the interior member, and thus make a tight joint and prevent any leakage of gases into the room. The groove or bead 8 also acts as a mortar groove, which becomes filled with mortar or cement when the thimble is installed and prevents its ready removal from the flue opening.

My device is preferably assembled as follows:—

I first take a strip of sheet metal of the desired width and length and place it between forming rollers, which gives it a cylindrical form. At the same time that the strip is being formed into a cylinder, the edge 6 is turned inwardly. The two ends of the member 4 are then riveted together. The interior member is then formed and secured by means of a rivet 15, the forward end being corrugated so as to give it a taper while the part adjacent the taper remains cylindrical. The two members having been now formed, the interior member is inserted within the cylindrical member 4 until the edge 13 contacts with the inturned portion 6. The device is then placed in a beading machine and the bead 5, the grooves or ribs 8 and 11, and the tapered portions 7 and 12 formed simultaneously. In this way the two members are held securely together and against any possibility of coming apart, and the device is ready for shipping or installation, and, as previously stated, the bead 5 at the forward edge limits the insertion of the thimble in the flue opening so that there is no possibility at any time of the thimble being jammed back into the flue.

Having fully described my invention, what I claim is:—

1. A stove pipe thimble comprising an outer member provided on one edge with an outwardly extending bead and on the end opposite said bead with a smooth tapered terminal portion the edge of the tapered portion being abruptly bent inwardly, an inner member having one end tapered and corrugated and its opposite end having a smooth tapered terminal portion abutting the inwardly bent portion, and an internally projecting bead formed in and completely around both members adjacent their terminal tapered portions for interlocking said members together and answering as a mortar groove.

2. A stove pipe thimble comprising an outer member provided on one edge with an outwardly extending bead and at the end opposite said bead with a smooth tapered terminal portion provided with an inturned edge, an inner member having one end corrugated and tapered and its opposite end having a smooth tapered terminal portion, and an internally projecting bead formed in and completely around both members adjacent their terminal tapered portions for interlocking said members together and answering as a mortar groove.

3. A stove pipe thimble comprising an outer member provided on one edge with an outwardly extending bead and at its opposite end with a smooth inwardly tapered terminal portion having an inturned edge, an inner member having a corrugated tapered end lying completely within and spaced apart from the outer member and having its opposite end provided with a smooth inwardly tapered portion, an internally projecting bead extending around both members adjacent the smooth terminal tapered portions of both members for interlocking the same together and providing a mortar groove, a rivet located in the outer member and in the inner member for securing the ends thereof, said rivets being positioned well in front of the bead so as to leave the outer margins of both members practically unattached whereby they may be freely tapered.

In testimony whereof I have affixed my signature.

JOSEPH L. HEMP.